(Model.)
J. M. WALDEN.
COTTON CHOPPER.
No. 263,632.　　　　　　　　　Patented Aug. 29, 1882.
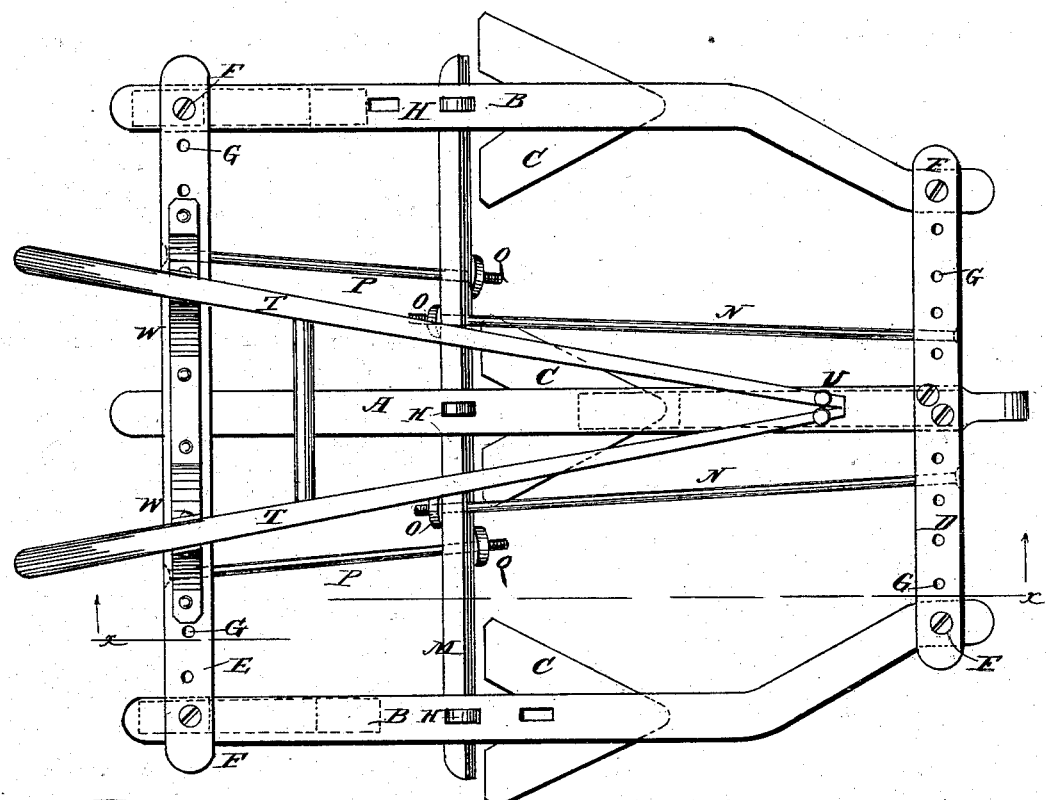
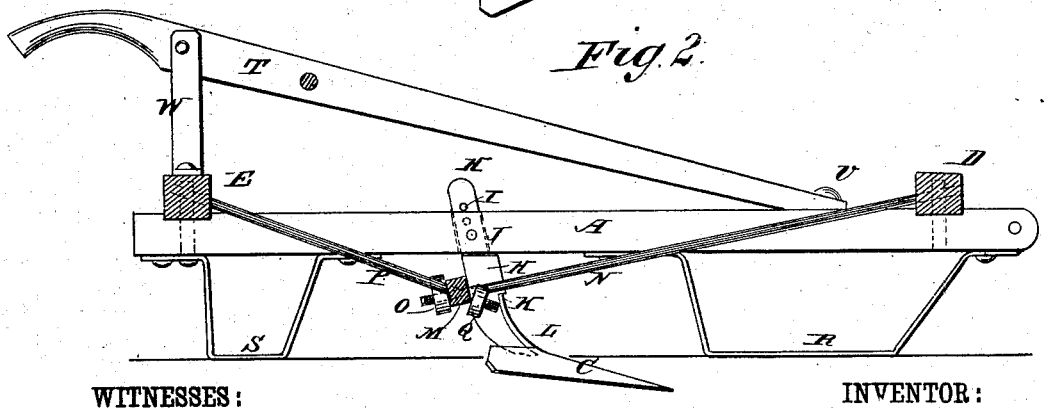
WITNESSES:
Francis McArdle
C. Sedgwick
INVENTOR:
J. M. Walden
BY Munn & Co
ATTORNEYS.

UNITED STATES PATENT OFFICE.

JOHN M. WALDEN, OF FORT VALLEY, GEORGIA.

COTTON-CHOPPER.

SPECIFICATION forming part of Letters Patent No. 263,632, dated August 29, 1882.

Application filed May 13, 1882. (Model.)

*To all whom it may concern:*

Be it known that I, JOHN M. WALDEN, of Fort Valley, in the county of Houston and State of Georgia, have invented a new and Improved Cotton-Chopper, of which the following is a full, clear, and exact description.

This invention consists of a frame of beams and cross-bars with runners and chopping-hoes, the beams being adjustable toward and form each other to vary the distances of the hoes apart, and according to the distance required between the chops in the rows of plants, and the hoes being adjustable in height and in their pitch to regulate the depth of the chops, as hereinafter fully described, and pointed out in the claims.

Reference is to be had to the accompanying drawings, forming part of this specification, in which similar letters of reference indicate corresponding parts in both the figures.

Figure 1 is a plan view of my improved cotton-chopper, and Fig. 2 is a longitudinal sectional elevation taken on line $x\ x$ of Fig. 1.

A represents a middle beam, and B two side beams, for carrying chopping-hoes or cutters C, said beams being connected at suitable distances apart, side by side, by cross-beams D and E, to which the side beams, B, are adjustably connected by bolts F, by which they can be shifted toward and from the middle beam when it may be required to change the hoes for varying the distances between the chops, the beams and the bolts being shifted from one to another of the holes G along the cross-bars.

H represents the chopper-stocks, which are fitted in mortises through the beams and provided with a series of holes, I, for securing them at different heights by the bolts J. The lower ends of these stocks are in this case curved at the front and shouldered at K suitably for bolting on the hoes by their shanks L, but they will in practice be constructed to suit other forms of the attaching device of the hoes, whatever they may be. These stocks are also fastened to a cross-bar, M, located behind them under the beams, and being connected to the front cross-bar, D, by rods N, with adjusting-nuts O, and also connected to the rear cross-bar, E, by rods P, with adjusting-nuts Q, so that said bar M may be shifted forward to swing the points up and lessen their depth in the ground, or backward to increase the depth without changing the stock on bolts J when it is not desired to change the depth materially. This contrivance is also employed to set the hoes for the right pitch or inclination to work best. The hoe-stocks are adjustable along bar M the same as beams B are adjustable along cross-bars D and E.

R represents a runner at the front, and S two runners at the rear, on which the chopper is drawn along the ground across the rows of plants to chop out the plants at intervals along the rows for thinning them. The front runner, R, is attached to the middle beam and crosses the rows of plants in front of the middle hoe, so that the plants injured by it are those chopped out. The rear runners follow the side hoes, passing through the gaps cut out of the rows by them. The runners serve better in crossing the ridges and hollows of the rows and spaces between them, and gage the hoes more evenly to the work than wheels would.

T represents the handles for the control of the machine, said handles being attached to middle beam at U and supported at the rear by standards W, attached to rear cross-bar, E.

Having thus fully described my invention, what I claim as new, and desire to secure by Letters Patent, is—

1. The combination of connecting-bar M and adjusting-rods N P with chopper-hoes C and the frame on which said hoes are mounted, as described.

2. The hoe-beams A and B, hoes C, and the connecting-beams D E, and bar M, in combination, said beams and hoes being alike adjustable along the cross-bars D E and connecting-bar M, respectively, substantially as described.

3. The hoe-stocks being vertically adjustable in the beams, and also adjustable by the bar M and rods N P, substantially as described.

JOHN MILLEDGE WALDEN.

Witnesses:
STEPHEN E. BASSETT,
JOHN D. MARSHALL.